(12) United States Patent
Kuo et al.

(10) Patent No.: US 10,739,151 B2
(45) Date of Patent: Aug. 11, 2020

(54) CLIENT-SERVER NAVIGATION SOLUTION FOR LOW DATA BANDWIDTH CONDITIONS

(71) Applicant: MITAC INTERNATIONAL CORP., Taoyuan (TW)

(72) Inventors: Juhang Kuo, San Dimas, CA (US); Alexey Pershin, San Dimas, CA (US); Sergey Portnov, San Dimas, CA (US); Mikhail Smirnov, San Dimas, CA (US); Alexander Melnikov, San Dimas, CA (US); Viktor Kanaev, San Dimas, CA (US)

(73) Assignees: MITAC INTERNATIONAL CORP., Taoyuan (TW); MiTAC Research (Shanghai) Ltd., Shanghai (CN)

( * ) Notice: Subject to any disclaimer, the term of this patent is extended or adjusted under 35 U.S.C. 154(b) by 400 days.

(21) Appl. No.: 15/802,432

(22) Filed: Nov. 2, 2017

(65) Prior Publication Data
US 2019/0128685 A1    May 2, 2019

(51) Int. Cl.
| | |
|---|---|
| *G01C 21/34* | (2006.01) |
| *G08G 1/123* | (2006.01) |
| *H04L 5/00* | (2006.01) |
| *G01S 19/39* | (2010.01) |
| *G01C 21/36* | (2006.01) |
| *H04W 4/024* | (2018.01) |

(52) U.S. Cl.
CPC ....... *G01C 21/3446* (2013.01); *G01C 21/367* (2013.01); *G01C 21/3629* (2013.01); *G01C 21/3688* (2013.01); *G01S 19/39* (2013.01); *H04L 5/0064* (2013.01); *H04W 4/024* (2018.02)

(58) Field of Classification Search
CPC ........... G01C 21/3446; G01C 21/3629; G01C 21/367; G01C 21/3688; G01C 21/3492; G01C 21/00; H04W 4/024
USPC ................ 701/533, 468, 428, 410, 431, 461
See application file for complete search history.

(56) References Cited

U.S. PATENT DOCUMENTS

| | | | |
|---|---|---|---|
| 2012/0303263 A1* | 11/2012 | Alam | G01C 21/32 701/410 |
| 2013/0096821 A1* | 4/2013 | Wong | G01C 21/3626 701/428 |
| 2013/0238239 A1* | 9/2013 | Rowley | G08G 1/096811 701/468 |

(Continued)

*Primary Examiner* — Mahmoud S Ismail
(74) *Attorney, Agent, or Firm* — Winston Hsu

(57) ABSTRACT

A method of providing vehicular navigation information includes providing a head unit embedded in a vehicle and configuring the head unit as a client device running an HTML-5 based navigation app. A smart phone is configured as a server device and linked to the head unit utilizing wireless local area network technologies. The wireless local area network technology may be Bluetooth. The smart phone transmits to the head unit via the wireless local area network technologies as needed a navigational map tile in vector format, a calculated route, and a proper subset of navigational raw voice guidance data stored on the smart phone. The HTML-5 based navigation app renders the navigational map tile and the calculated route geometry on a display of the head unit and the head unit plays at least a portion of the proper subset of the navigational raw voice guidance data through a speaker.

7 Claims, 5 Drawing Sheets

(56) References Cited

U.S. PATENT DOCUMENTS

2015/0292899 A1* 10/2015 Ohashi ............... G01C 21/3667
                                                    701/533
2016/0292815 A1* 10/2016 Bell ..................... G06T 1/20
2017/0108347 A1*  4/2017 Zhu ..................... G06F 16/29

* cited by examiner

CLIENT-SERVER NAVIGATION SOLUTION FOR LOW DATA BANDWIDTH CONDITIONS

BACKGROUND OF THE INVENTION

1. Field of the Invention

This application is directed toward vehicular navigation systems and more specifically toward a client-server navigation solution for low data bandwidth conditions in a vehicular navigation system.

2. Description of the Prior Art

A common use of a vehicular head unit is to display navigational maps on the head unit's graphical display (or touch-screen) and play associated audio navigational instructions through the head unit's speaker(s). The maps and audio are often provided in bulk to the head unit by a cell phone using Bluetooth technologies. One problem with this system is that maps and oral instructions typically require a larger amount of Bluetooth bandwidth for their timely acquisition than is normally provided by the head unit, resulting in unacceptable lag times between need and display of current navigational data.

SUMMARY OF THE INVENTION

To reduce or eliminate the prior art lag times between need and display of navigational data in vehicular navigational systems, a method and device configured to utilize the method offering a client-server navigation solution for low data bandwidth conditions is proposed.

A method of providing vehicular navigation information includes providing a head unit embedded in a vehicle and configuring the head unit as a client device running an HTML-5 based navigation app. A smart phone is configured as a server device and linked to the head unit utilizing wireless local area network technologies. The wireless local area network technology may be Bluetooth. The smart phone transmits to the head unit via the wireless local area network technologies as needed a navigational map tile in vector format, a calculated route, and a proper subset of navigational raw voice guidance data stored on the smart phone. The HTML-5 based navigation app renders the navigational map tile and the calculated route geometry on a display of the head unit and the head unit plays at least a portion of the proper subset of the navigational raw voice guidance data through a speaker.

In some embodiments, the head unit includes a graphical processing unit and the method further comprises the HTML-5 based navigation app utilizing the graphical processing unit when rendering the navigational map tile on the display of the head unit.

In some embodiments, the smart phone breaks the navigational raw voice guidance data stored on the smart phone into the proper subset, wherein the proper subset consists of a single navigational raw voice guidance.

In some embodiments, the method includes clipping the calculated route geometry according to geometry of the navigational map tile before transmitting the calculated route geometry from the smart phone to the head unit. The smart phone may clip the calculated route geometry by navigational map tile utilizing run-time generalization depending on scale.

These and other objectives of the present invention will no doubt become obvious to those of ordinary skill in the art after reading the following detailed description of the preferred embodiment that is illustrated in the various figures and drawings.

DETAILED DESCRIPTION

The proposed answer to the limited Bluetooth bandwidth problem for navigational information implements a client-server navigation solution with good performance in low data bandwidth conditions. The server is running on a smart phone. A navigation app is HTML-5 (HyperText Markup Language version 5 as published by the World Wide Web Consortium) based and running on an embedded vehicle head unit as the client. The physical channel permitting data exchange between the server and the client may be based on Bluetooth technologies that have rather low bandwidth.

It should be stated that Bluetooth technologies are the preferred method of data transfer between the smart phone and the head unit, since Bluetooth has good performance in reducing power usage. Also, Bluetooth is commonly supported by head units and smartphones so that there is much more convenience when the client and server are each connected through Bluetooth interface. Thus there is a need to reduce the need of data transmission since the bandwidth is quite limited in Bluetooth.

Figure 1:
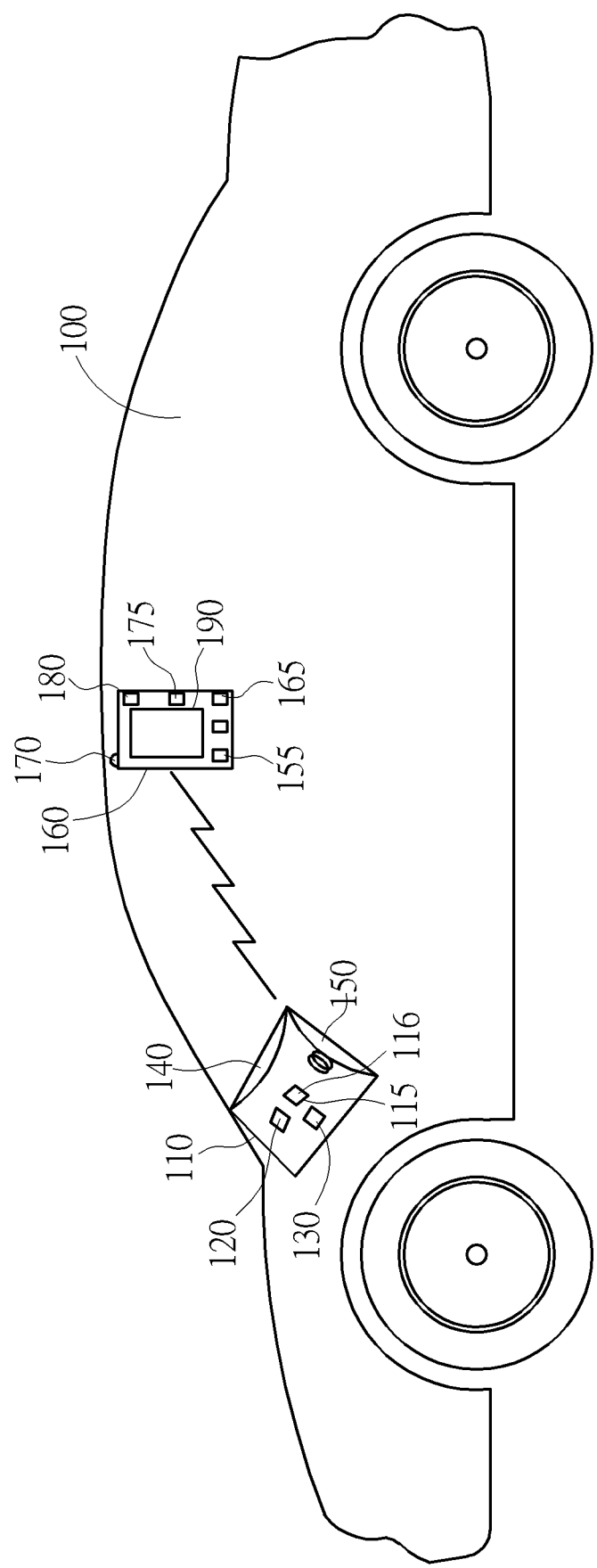
FIG. 1 is a functional block drawing of a client-server navigation solution for low data bandwidth conditions in a vehicular navigation system.

Used herein, the term "head unit" refers to an embedded vehicular in-dash stereo such as shown in FIG. 1. The head unit 110 is the heart of a vehicle 100 audio system and can include a radio tuner, CD player, auxiliary inputs, a graphical and/or touch-screen display 140, physical user-interface controls, interactive or one-way voice interfaces, a processing module 120, and a speaker 150. A memory 115 comprises the HTML-5 based navigation app 116 running on the embedded vehicle head unit 110 as the client. The head unit 110 may also be equipped with telecommunication interfaces including terrestrial or satellite radio, a Bluetooth module 130, and GPS. Preferably, the head unit 110 does not have its own GPS module and obtain GPS related data directly from the server 160.

A smart phone 160 (the server) may comprise circuitry for cellular voice and data technologies 180, a display 190, a speaker 170, a GPS module, a processing module 165, a memory 175, and a Bluetooth module 155. The Bluetooth module 155 of the smart phone 160 is paired and linked via Bluetooth to the Bluetooth module 130 of the head unit 110 to provide the head unit 110 navigational information. Navigational information may be stored in the memory 175 of the smart phone 160 or downloaded to the smart phone 160 and stored in the memory 175 as needed using the cellular voice and/or data technologies 180. The smart phone 160 provides the navigational information in a timely manner to the head unit 100 using the Bluetooth link.

This proposal includes three major innovations to reduce the bandwidth bottleneck found in prior art navigation systems by reducing the amount of data that must be transmitted via Bluetooth. The first of these innovations is to decrease the graphical data transfer size required to render the navigational map.

Graphical data used to render the navigational map consumes a large amount of bandwidth, especially when moving rapidly, panning, and/or zooming. Graphical data also can exist in many different formats, each format having its own properties including data size and display characteristics. To minimize the size of the graphical data needing to be transferred from the smart phone 160 to the head unit 110, map tiles are each generated in vector format, preferably using Mercator projection. The number of features included in each tile are not calculated dynamically (on run time), the appropriate detailing (depending on scale) is determined empirically by means of multiple experiments to achieve reasonable a tradeoff between map quality and performance.

Figure 5:
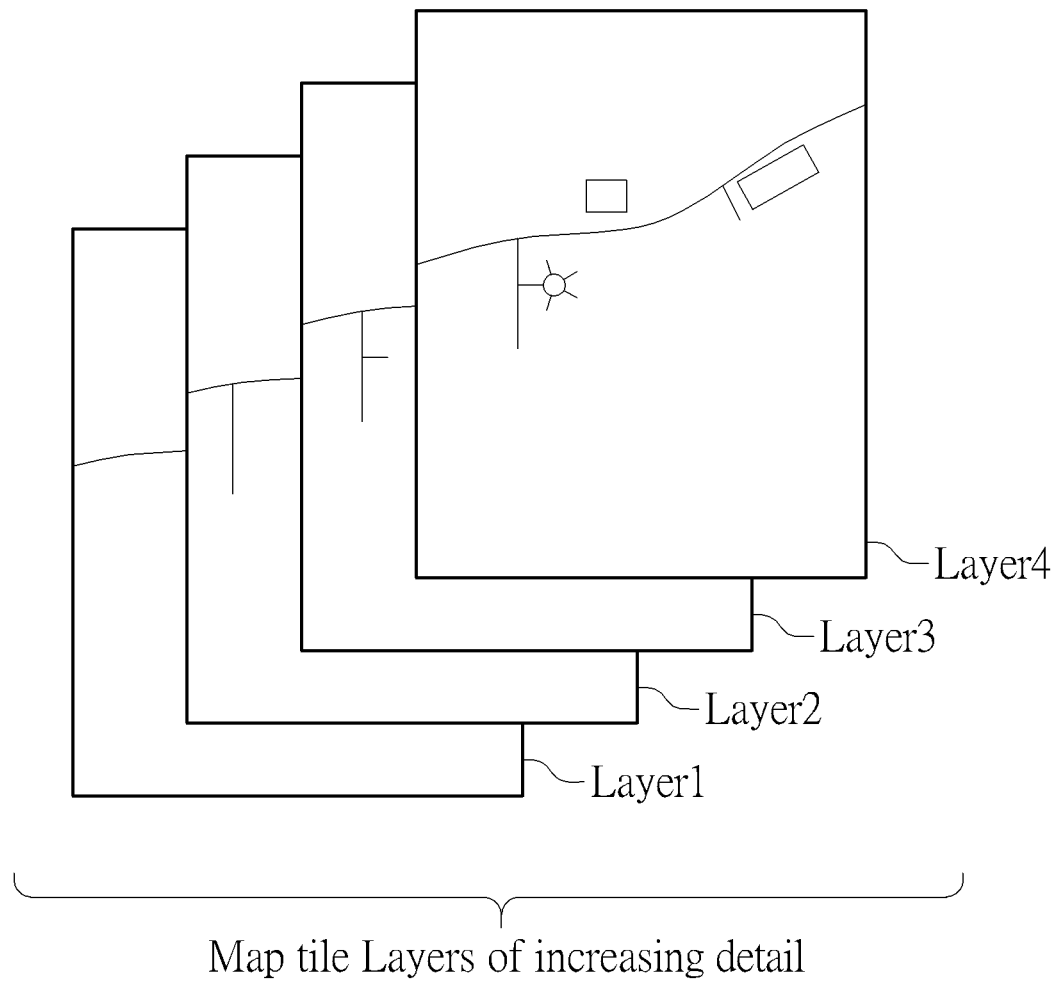
FIG. 5 illustrates a map tile generated using Mercator projection to produce a plurality of layers of increasing detail.

For each tile, a plurality of layers may be generated, with each layer displaying different levels of detail. FIG. 5 illustrates such a map tile that includes 4 layers of differing detail, with layer 1 having the least amount of detail, and layers 2-4 each successively increasing in detail. The exact number of layers is subject to design considerations and may be any number greater than 0, and preferably greater than 1.

The client determines the detail level of a map tile displayed by the head unit. When the client makes request from the server, at least two parameters may be present: Give Tile having TileId=Id and DetailsLevel=level. When the client 110 needs a different level of detail for a tile than the level of detail that is currently displayed, the client 110 checks its cache. When present in the cache, the tile having the need detail is displayed. When not present in the cache of the client 110, the client 110 requests the needed more/less detailed level from the server 160. If the client 110 requires a higher level of detail than it has in the cache, the client 110 may render a less detailed tile (already present in the cache of the client 160) while waiting for the server 160 to transmit the requested level of detail.

Upon receiving the request, the server 160 checks its own cache for the needed level of detail for the tile. When already present in the cache of the server 160, the tile with the needed level of detail is sent to the client 110 for display. When not present in the cache of the server 160, the tile with the needed level of detail will be generated by the server 160 and then sent to the client 110 for display. Each layer may, in some embodiments, be transparent except for the details unique to that layer so that the layers can be added or subtracted from each other as needed. This reduces needed bandwidth by reducing the amount of information coded into each layer.

Vector data is generalized/simplified depending on the scale and/or level of detail, which reduces needed bandwidth. It is preferred that the vector data is prepared by the smart phone 160 on request from the client 110 and the client 110 is responsible to render the vector data using its HTML-5 capabilities. Since the client (the HTML-5 based navigation app 116) is written in HTML-5, rendering of the vector format map tiles can be performed efficiently, preferably using Java Script and a graphical processing unit (GPU) 120 on the client side for presentation on the display 140.

When the client 110 requires a specific tile, it may first check a cache in the memory 115 of the head unit 110 to see if any layer of the specific tile has already been downloaded from the smart phone 160 and stored in the cache. If the cache already contains at least one layer of the needed specific tile, that layer can be immediately rendered by the head unit 110 without the need for any bandwidth. If the layer in the cache is not at the level of detail needed by the client, the layer may still be rendered immediately to give the user what information is instantly available while the correct layer is downloaded from the smart phone 160 and rendered. For example, suppose the cache contains only layer 1 of the tile shown in FIG. 5 but requires the extra detail shown in layer 4. Layer 1 would then be rendered by the head unit 110 while the head unit 110 requests and downloads layer 4 from the smart phone 160. When layer 4 has been received by the head unit 110, layer 1 on the screen 140 would be replaced by layer 4 of the map tile. The features included in each map tile or layer of a map tile are preferably not calculated dynamically (at run time). The appropriate detailing (depending on scale) is determined empirically by means of multiple experiments to achieve a reasonable tradeoff between map quality and performance.

Some embodiments also make use of the memory 175 of the smart phone 160 as a cache of previously generated map tiles or layers of map tiles. In this situation, when the client 110 requests a needed map tile or layer, the server 160 would first check the cache in the memory 175. If present in the cache, the previously generated map tile or layer can be instantly downloaded to the head unit 110. If the needed map tile or layer is not present in the cache of the smart phone 160, the smart phone may check to see if any layer of the requested map tile is present in the cache, and if present, immediately download that layer to the head unit 110 for immediate display while the smart phone 160 generates the requested map tile or layer for subsequent downloading to the head unit 110. This feature reduces lag time and presents the user with sometime useful while the requested information is being generated.

After the client 110, i.e. the head unit running the HTML-5 based navigation app, is connected to the server, i.e., the smart phone also running the HTML-5 based navigation app, via Bluetooth, a user can enter a start node and a goal node (destination) through a user interface of the client 110 for navigational assistance. In many embodiments, it is not necessary for the user to enter the start node explicitly because the current position (according to GPS) is preferably automatically considered as the start when generating a navigational route. The user can enter the goal node in many ways such as a result of search: POIs, Places, roads and addresses, as result of a map click, and as result of address book element selection.

Some embodiments may anticipate, or predict, a future need of a specific map tile or layer according to route geometry. Since the server 160 knows the direction and speed that user is moving and knows the current level of detail of the tile being displayed, the server 160 tries to prepare required tiles in advance (then store the prepared tile in the cache of the server 160) to perform future requests from the client 110 very quickly. The server 160 also knows what and where the destination is and has access to GPS data and does not have to wait for an explicit request from the client 110, and may, without receiving a request from the client 110, download data required to create map tiles in anticipation of a need for a specific map tile or layer according to route geometry. Such tiles may cover, inter alia, a reasonable neighborhood area around the current position and future propagated position (that can be calculated using velocity and bearing), a reasonable neighborhood area around the destination, and/or a routing "corridor" in case if some route becomes active.

It is preferred that even when the server 160 pre-generates a predicted tile, tiles are not transmitted to the client 110 until and unless requested by the client 110. This further avoids wasting bandwidth on data not used.

For example, when following a navigational route, if the position of the head unit 110 is nearing a location along the route where the route crosses over from a currently rendered tile to an as-of-yet un-generated map tile, the smart phone may generate and store in the cache the future tile in anticipation of future use, where it will be instantly available when the client 110 requests it.

In some embodiments, this is further extended to include specific layers of detail. For example, often when traveling along a highway, only a low level of map detail is required by the user. However, when approaching a town, a higher level of detail of the same map tile would be desired. The smart phone 160 can anticipate this, pre-generate the appropriate levels of the map tile(s), and store them in the cache so they will be instantly available upon request by the head unit 110. Transmission of any tile is initiated by explicit request from client (HTML5) application. However, since the server 160 has already done some predictive work, the required tiles are already in the server' cache and can be downloaded to the head unit 110 immediately if requested.

This combination of vector-format map tiles and the HTML-5 based navigation app 116 significantly decreases the size of map tiles needing to be transferred from the smart phone 160 to the head unit 110. Furthermore, the vector format permits reuse of already cached map tiles when a user zooms in/out to render map scene immediately instead of waiting for tiles that correspond to the new scale to be downloaded. Reuse of cached map tiles further reduces needed bandwidth. Of course, new tiles will be transferred from the smart phone 160 to the head unit 100 when needed due to a changed map scene. Additionally, the tile structure itself allows downloading only required chunks of data (not the whole scene) when a user pans or zooms in/out.

A second of these innovations is to decrease the data transfer size required to render results of route calculation on the navigational map. This approach is not to transfer the whole route path geometry but provide route path geometry clipped by tile using run-time generalization depending on scale.

After the server (smartphone) 160 has decided the route, the client 110 knows that the route is calculated. To draw/ highlight the route on the map view on the display of the head unit 110, the client 110 requests the server 160 to transmit the portion of the route associated with each tile that covers the screen. The server clips the route according to the geometry of each tile that covers the screen. The server 160 then transmits to the client 110 the clipped portion of the route associated with the tile, for each tile currently on display. The server holds the entire route geometry and clips the route geometry against the tiles as result of client requests.

Figure 2:
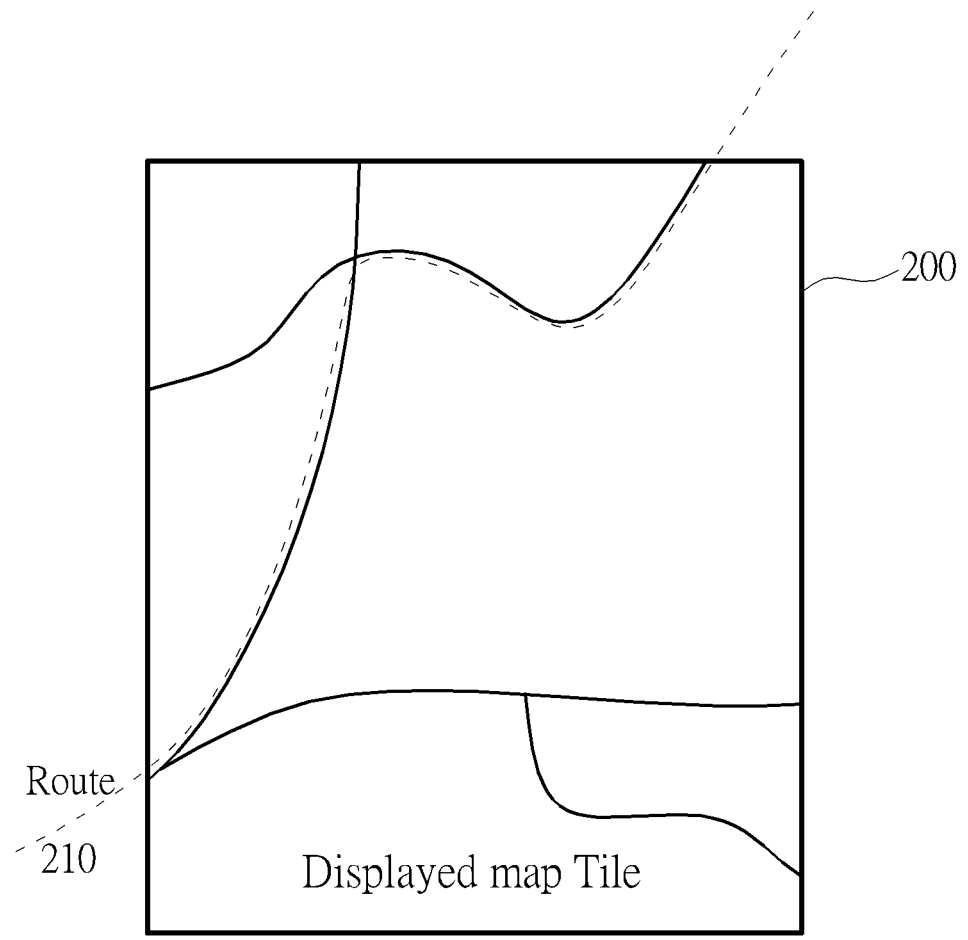
FIG. 2 illustrates clipping route geometry to tile geometry.

The full route, shown in FIG. 2 as "Route 210", may be calculated normally, however in this embodiment the full route 210 may not be transferred to the head unit 100 unless the calculated full route 210 happens to fit within the currently displayed map tile(s). In FIG. 2, the full route 210 does not fit on the currently displayed map tile 200 even though the currently displayed map tile is shown in its entirety on the display 140 of the head unit 110. Here, the route information is clipped so that it includes only route information for portions of the full route 210 that correspond to the map tile 200 before being transferred to the head unit 110. If additional map tiles are also currently displayed, route information corresponding to those tiles is likewise transferred after being clipped similarly. Thus, there may be two kinds of tiles used by the client: a first kind of tile containing mapping data only and a second kind of tile containing clipped route geometry. Due to possibly changing route geometry, the second kind of tile is volatile.

Figure 3:
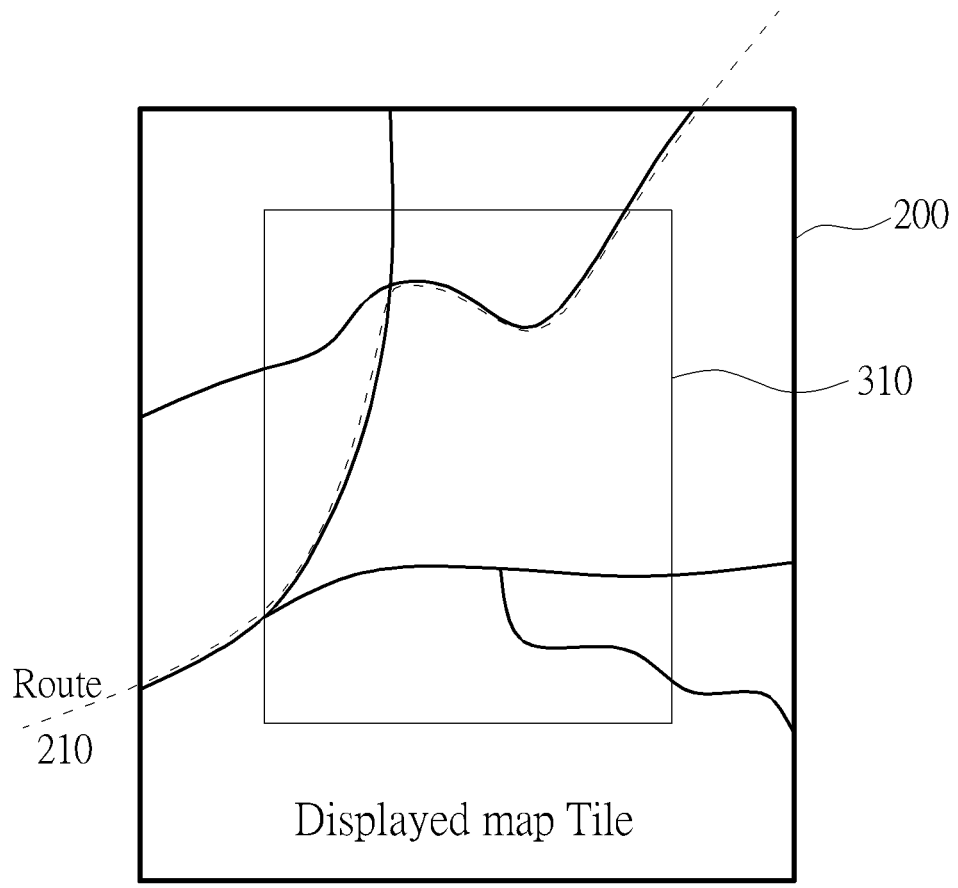
FIG. 3 illustrates clipping route clipped to displayed portion of tile geometry.

Sometimes due to pan or zoom, the entire map tile 200 is not displayed on the display 140 of the head unit 110 as shown in FIG. 3. In FIG. 3, only the area of the map tile indicated as 310 is displayed due to a zoom. When less than the entire map tile 200 is displayed, the full route 210 is clipped to correspond to the currently used map tile 200 at the scale that the map tile 200 is being displayed and only the clipped portion of the route 210 is transmitted from the smart phone 160 to the head unit 110. According to design considerations, the clipped portion of the route 210 may include all portions of the route corresponding to the currently used map tile 200. Alternatively, the clipped portion of the route 210 may include only portions of the route 210 corresponding to the currently displayed portion of map tile 200 shown by the area of the map tile indicated as 310, which may be less than the entire map tile 200.

A third of these innovations is to decrease the data transfer size required for transfer of audio navigational information. Conventionally, navigational raw voice data is downloaded and stored in bulk in the memory 115 of the head unit 110, where it is accessed and played by the navigation app 116 as needed. This creates a huge demand on bandwidth between the smart phone 160 and the head unit 110 due to the size of the required raw voice data. This innovation proposes storing the navigational raw voice data in the memory 175 of the smart phone 160 rather than explicitly transferring all of the navigational raw voice data to the memory 115 of the head unit 110.

Instead, the navigational raw voice data is transferred from the smart phone 160 to the head unit 110 implicitly on demand, so the whole amount of navigational voice data (which can be huge) is split into relatively small chunks that are transferred when only necessary. A small chunk of navigational voice data may be a single guidance, for example, inter alia, "turn left", "turn right in 500 meters", and "your destination is straight ahead". A small chunk of navigational voice data may also be more than one individual guidance, whether related or unrelated according to design considerations, as long as the "small chunk" is smaller in size than the whole amount of navigational voice data (a proper subset of the whole amount of navigational voice data stored in the memory 175, where a proper subset is less than the whole amount) and transferred on demand.

By transferring navigational raw voice data from the smart phone 160 to the head unit 110 in small chunks implicitly on demand, the needed bandwidth at any one time can be reduced considerably. Further savings in bandwidth can also be achieved by not transferring navigational raw voice data that is not demanded for the current route and/or tile.

Figure 4:
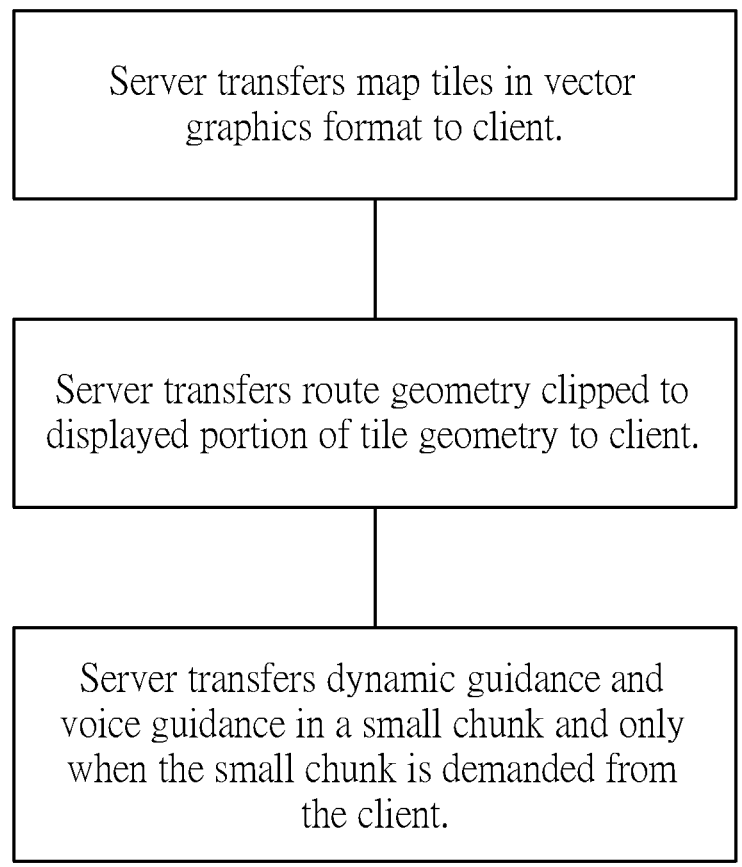
FIG. 4 outlines steps for minimizing used bandwidth between the server and the client in the vehicular navigation system of FIG. 1.

While each of the three bandwidth reducing innovations can be independent implemented, bandwidth savings can be maximized by employing combinations of these innovations, preferably all three. In this situation, vector graphics are utilized to generate the map tiles, route geometry is clipped by tile using run-time generalization depending on scale, and dynamic guidance events and voice guidance is provided without transferring large amount of data. The vector data is prepared by the smart phone 160 (server) on request and the head unit 110 (client) is responsible for rendering the vector data using HTML-5 capabilities of the HTML-5 based navigation app 116. The clipped route geometry is generated on demand and by the smart phone 160 and transferred to the head unit 110. Small chunks of navigational raw voice data are also generated on demand by the smart phone 160 and transferred to the head unit 110 implicitly. FIG. 4 outlines these three steps for minimizing used bandwidth between the smart phone 160 and the head unit 110.

When implemented, the solution described above provides a good balance of operation responsibility between the client and server to give full navigation functionality with map display even in a case of significantly restricted data transfer throughput of a Bluetooth communication channel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing vehicular navigation information, the method comprising:
    providing a head unit embedded in a vehicle;
    configuring the head unit as a client device running an HTML-5 based navigation app;
    configuring a smart phone as a server device;
    linking the head unit and the smart phone utilizing Bluetooth technologies link;
    transmitting, as needed, a navigational map tile in vector format from the smart phone to the head unit via the Bluetooth technologies link, the smart phone generating the navigational map tile in vector data format utilizing Mercator projection, the generated navigational map tile comprising a plurality of layers, each layer containing a different level of detail;
    transmitting, as needed, a calculated route geometry from the smart phone to the head unit via the Bluetooth technologies link;
    the smart phone pre-generating a navigational map tile not yet requested by the head unit according to the calculated route geometry;
    the smart phone transmitting at least a layer of the pre-generated navigational map tile not yet requested by the head unit to the head unit, the head unit storing the at least a layer of the pre-generated navigational map tile not yet requested by the head unit into a cache of the head unit;
    transmitting, as needed, a proper subset of navigational raw voice guidance data stored on the smart phone from the smart phone to the head unit via the Bluetooth technologies link;
    the HTML-5 based navigation app rendering the navigational map tile and the calculated route geometry on a display of the head unit; and
    the head unit playing at least a portion of the proper subset of the navigational raw voice guidance data through a speaker.

2. The method of claim 1 wherein the head unit comprises a graphical processing unit and the method further comprises the HTML-5 based navigation app utilizing the graphical processing unit when rendering the navigational map tile on the display of the head unit.

3. The method of claim 1 further comprising the smart phone breaking the navigational raw voice guidance data stored on the smart phone into the proper subset, wherein the proper subset consists of a single navigational raw voice guidance.

4. The method of claim 1 further comprising clipping the calculated route geometry according to geometry of the navigational map tile before transmitting the calculated route geometry from the smart phone to the head unit via the Bluetooth technologies link.

5. The method of claim 1 further comprising the smart phone generating the navigational map tile in vector data format utilizing Mercator projection on request.

6. The method of claim 1 further comprising the head unit checking the cache of the head unit for a needed layer of the navigational map tile before requesting the needed layer of the navigational map tile from the smart phone.

7. The method of claim 1 further comprising the head unit displaying a not needed first layer of the navigational map tile obtained from a cache of the head unit while waiting for a needed second layer of the navigational map tile to be transmitted from the smart phone, the first layer and the second layer having different levels of detail.

* * * * *